Jan. 18, 1955 J. M. IDE 2,699,835
ACOUSTIC TESTING METHOD
Original Filed Nov. 12, 1943 3 Sheets-Sheet 1
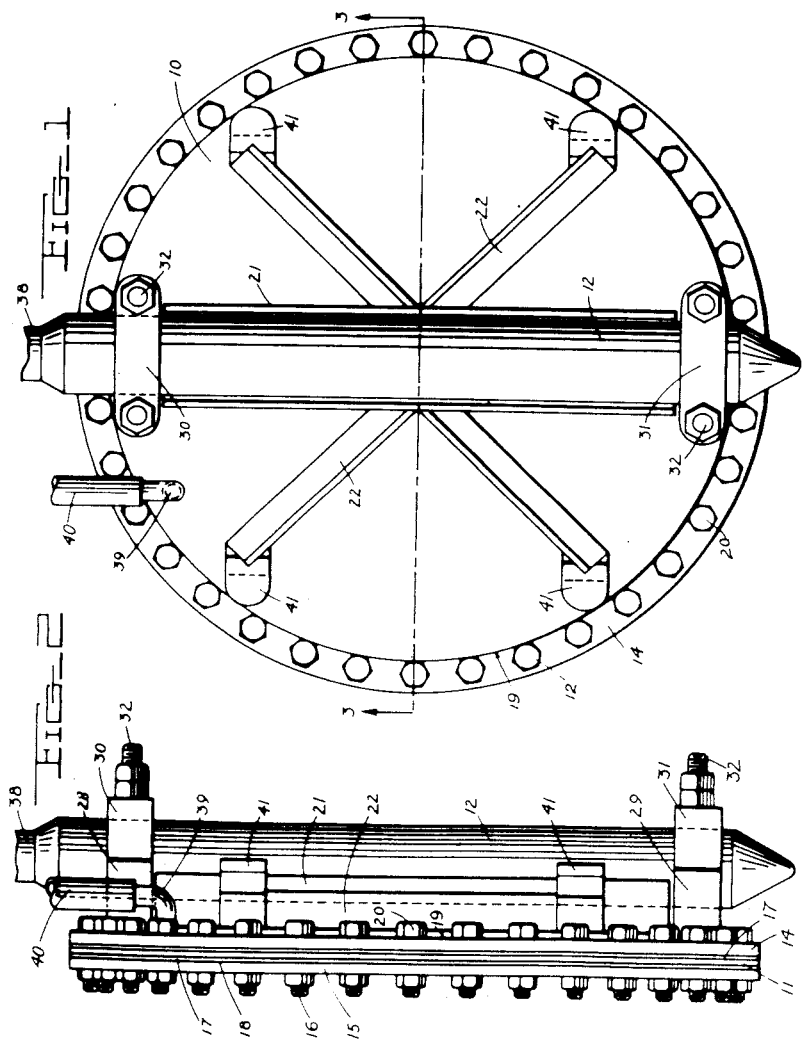
INVENTOR
JOHN M. IDE
ATTORNEYS

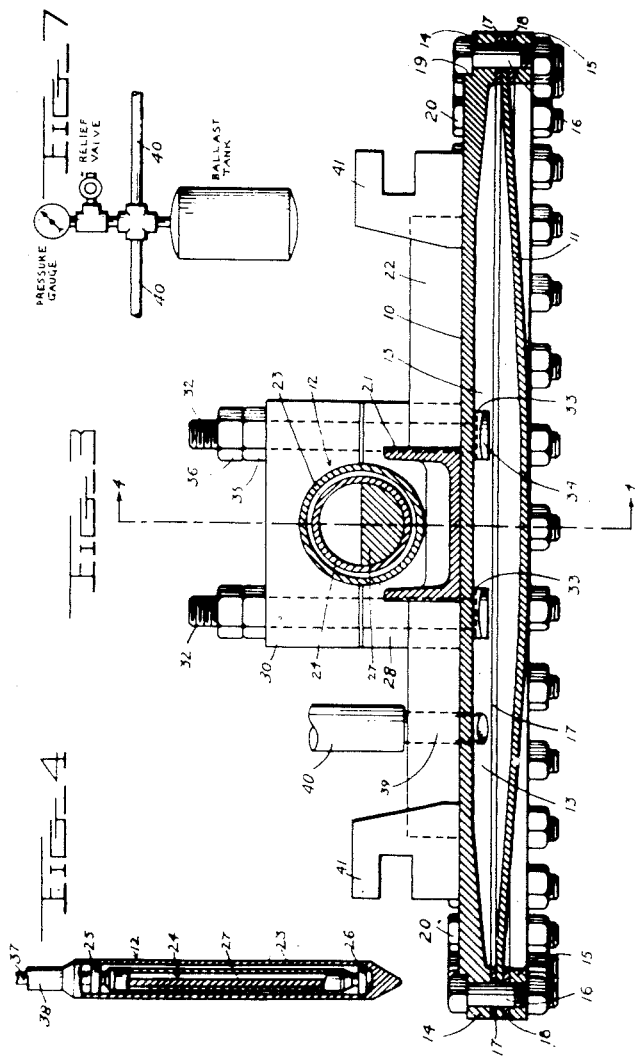

Jan. 18, 1955  J. M. IDE  2,699,835
ACOUSTIC TESTING METHOD
Original Filed Nov. 12, 1943  3 Sheets-Sheet 3
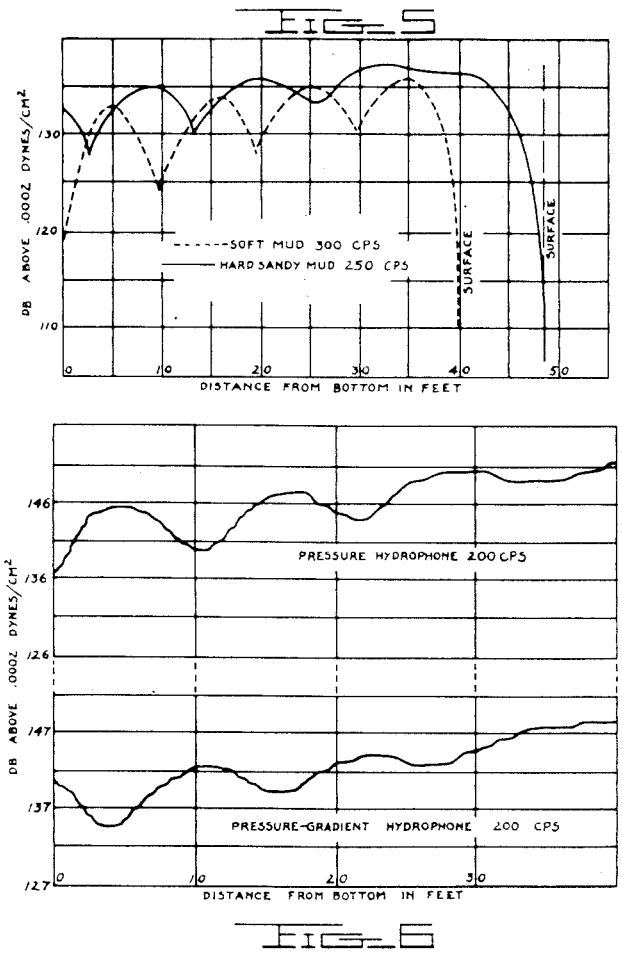
INVENTOR
JOHN M. IDE
ATTORNEYS United States Patent Office 2,699,835
Patented Jan. 18, 1955

2,699,835

ACOUSTIC TESTING METHOD

John M. Ide, Quaker Hill, Conn.

Original application November 12, 1943, Serial No. 510,042. Divided and this application January 27, 1950, Serial No. 140,921

4 Claims. (Cl. 181—0.5)

(Granted under Title 35, U. S. Code (1952), sec. 266)

The present invention relates to underwater acoustical testing methods and has as an object the provision of a method for ascertaining certain acoustical characteristics of the bottom of a water-way such as a river bottom or sea bottom, particularly those characteristics which affect the propagation of underwater sound and which determine the initial phase of a reflected-wave pattern.

Various other objects and advantages of the invention will become apparent from a perusal of the following specification and the drawings accompanying the same. The present application is a division of my copending application Serial No. 510,042, filed November 12, 1943, for Underwater Sound Generator, now Patent No. 2,495,730.

In the drawings:

Fig. 1 is a rear plan view of a sound generator capable of use in carrying out the present method.

Fig. 2 is an edgewise view looking at the left edge of Fig. 1.

Fig. 3 is a section on the line 3—3 of Fig. 1 on an enlarged scale.

Fig. 4 is a section on the line 4—4 of Fig. 3 on a reduced scale and omitting all parts except the unbalanced rotor device per se.

Fig. 5 is a reproduction of a pair of superposed records made with a pressure-actuated hydrophone.

Fig. 6 is a reproduction of a pair of comparison records made with different types of hydrophones.

Fig. 7 is a diagram showing pressure control connections.

The sound generator comprises in general a pair of oppositely facing sound-generating surface elements, one a substantially rigid base supporting element 10 in the form of a dished diaphragm preferably of metal such as iron and the other a relatively flexible, resilient diaphragm 11 preferably of steel mounted on the supporting diaphragm 10, together with a driving vibrator element 12 rigidly coupled to the supporting diaphragm 10 for vibrating the latter. The generator as a whole is of general disk shape, presenting an edgewise aspect having an area several times less than that of the diaphragm 11 or the rear face of the base 10. The base 10 which as a whole constitutes a rigid diaphragm is dished on the side toward the flexible diaphragm to form a shallow chamber 13, Fig. 3, surrounded by an annular mounting rim 14 onto which the diaphragm is clamped by means of a clamping ring 15 and screw bolts 16. A gasket 17 of rubber or other suitable material interposed between the mounting rim 14 and the outer margin of the diaphragm, seals the chamber 13. An outer gasket 18 beneath the clamping ring compensates for irregularities in the opposing surfaces of the ring and diaphragm, avoids metal-to-metal contact and, together with the inner gasket 17 permits slight movement of the diaphragm between the mounting rim 14 and the clamping ring 15 while maintaining continuous contact between the adjoining parts. An annular shoulder 19 formed in the base 10 at the rear of the mounting rim serves to lock the bolt heads 20 against turning, by engagement with a flat side of the latter thus facilitating the mounting of the diaphragm.

To increase the stiffness of the base element 10 without undue increase in weight, suitable stiffening ribs are provided, one in the form of an outwardly facing channel element 21 extending diametrically across the rear face of the base and the others in the form of radially extending angle members 22, all rigidly secured to the rear face of the base in any suitable manner as by welding. It will be understood, however, that such stiffening ribs or their equivalent may be cast integrally with the base element.

The vibrator element 12 is of the unbalanced type. The one used in the embodiment of the invention here shown is what is known as a concrete vibrator, usually employed for the stirring or puddling of wet concrete. It comprises a non-rotary casing 23 containing an unbalanced-rotor element 24 journaled at its ends in antifriction bearings 25—26 mounted within the casing near the ends of the latter. An unbalanced condition of the rotor is established through the use of a filling 27 of heavy material such as lead, within the tubular rotor element 24 to one side of the axis of rotation. The rotor 24 is driven by a flexible shaft 37 extending away from the vibrator element through a flexible housing or hose 38.

Clamping lugs 28—29 and caps 30—31 with throughbolts 32, firmly fix the vibrator element 12 to the base element 10. Countersunk portions 33 (Fig. 3) on the inner side of the base element 10 receive the heads 34 of the bolts, the shanks of which extend through the clamping lugs and caps to the tops of the caps where on their threaded ends they receive clamping nuts 35 and lock nuts 36. A suitable sealing material, not shown, preferably soft solder provides a sealed connection between the bolt heads and the countersunk portions which receive them, and holds the bolts in place during assemblage and clamping of the parts together.

This arrangement of the mounting lugs at the ends of the channel-beam permits the vibrator element to be mounted in line with the beam and partly within the channel, and makes for strength, compactness and symmetry in the structure as a whole. To afford efficient transmission of driving force directly from the bearings of the vibrator element to the base member, the mounting lugs and clamps are arranged to engage with the vibrator in the planes of the bearings 25 and 26. This arrangement also has the advantage that the clamping of the vibrator element takes place where the casing is braced by the sturdy outer rings of the anti-friction bearings 25—26 thus permitting a firm, tight clamping of the vibrator without danger of distorting the casing.

To enable the natural frequency of the diaphragm to be varied without variation in mechanical structure or interference with the driving connections, means are provided for adjusting the air pressure in the chamber 13 to different values. This comprises an air coupling element 39 connecting the interior of the chamber 13 with a flexible pipe 40 for the admission and release of air.

Any known or other suitable source of air or other gas under pressure, and valved connection of the pipe 39 therewith, not shown may be used. Because of the small volume of the chamber 13 of the sound generator, there would result substantial reduction in pressure of the confined gas upon even an extremely small leakage, and to offset this a suitable ballast tank is maintained in communication with the pipe 40 as indicated diagrammatically in Fig. 7. Also as here indicated the pipe 40 is maintained in communication with a pressure gauge and exhaust valve.

It is preferable that the diaphragm 11 be pre-formed into a slightly, outwardly-bulged shape as shown, and it has been found that an advantageous method of accomplishing this is to do so after the diaphragm is clamped in place and by air pressure applied to the interior of the chamber 13 to force the diaphragm outward sufficiently beyond its elastic limit to establish the desired permanent set. This method of shaping the diaphragm has the further advantage of avoiding the use of forming dies and permitting the diaphragm to be drilled for the clamping bolts and clamped in place while in the flat condition. It also avoids the necessity for any substantial allowance in the original dimensions of the diaphragm for distortion incident to the forming. Guide hooks 41 secured to the base element 10 at the outer ends of the four stiffening ribs 22 serve to hold the apparatus in a supporting frame not shown and which may be of any known or other suitable form capable of slight horizontal displacement to permit horizontal oscillatory movement of the base element.

In use, the apparatus is carried by a mine sweeping ship below the hull, preferably lowered into the water through a well or sea chest in the ship's hull. To reduce resistance to movement through the water, the apparatus is positioned in a vertical plane parallel to the ship's keel so as to move edgewise through the water with the movement of the ship. It is placed a distance of several feet below the surface of the water depending upon the frequency of the sound waves to be generated and at least a quarter wave length. With the flexible driving shaft connected to a suitable source of mechanical power and the air pipe connected to a source of air under pressure, the apparatus is ready for use. It is not essential to the working of the device to maintain pressure above that of the hydrostatic pressure of the surrounding water between the diaphragm and the base element, a variation in such pressure being necessary only for varying the resonant frequency of the diaphragm. Upon actuation of the vibrator element by rotation of its unbalanced rotor, the substantially rigid or stiff base element 10 is set into vibration without flexing and at an amplitude determined by the ratio of masses of the eccentric weight of the rotor and the remainder of the base with its rigidly connected accessories. The base element 10 with its rigidly connected accessories on the one hand, and the effective mass of the flexible diaphragm on the other hand, form a pair of weights coupled together by the compliance of the flexible diaphragm. Such a combination has the name "tonpilz" in German, but there is no single English word for it. The system vibrates with a single degree of freedom in which the displacements of the masses are 180° out of phase. Accordingly at resonance the pressures produced by the outer face of the diaphragm 11 and the outer face of the base element 10, are additive, resulting in a substantially omnidirectional field pattern as from a point source, as distinguished from the figure eight pattern of a dipole source.

Because of the periodic application of force by the vibrator in all directions through a complete circle in a horizontal plane, there is, of course, also an edgewise vibration of the generator as a whole, but due to its general flat-disk form the aspect areas of its two side edges are so small relatively that disturbance therefrom is negligible. Inasmuch as the oppositely facing, disk-like generating surfaces operate in phase opposition and are small in diameter relative to the length of the sound wave generated, the net result is in effect that of a point source of periodic compressional waves, of a frequency equal to the frequency of rotation of the eccentric weight of the vibrator and harmonics thereof. The output may be characterized as polyphonic, a word here used to designate a fundamental frequency accompanied by harmonics the intensity of which decreases with the order. At resonance, that is with the vibrator operating at the natural or resonant frequency of the diaphragm, the greater portion of the energy radiated as sound comes from the diaphragm. It is obvious that the base element 10 should be made as light as possible in order to obtain maximum vibration amplitudes from the available force, and that for maximum efficiency the diaphragm should have a natural frequency substantially equal to that at which the vibrator element 12 is driven. With the air pressure behind the diaphragm at substantially that of the hydrostatic pressure of the surrounding water, the natural frequency of a given diaphragm is at its lowest. As the pressure in the chamber 13 is increased, resonance becomes broader owing to damping in the air chamber, while the natural frequency of the diaphragm rises owing to stiffness added by the compressed air and to tangential or radial tension resulting from the stretching of the diaphragm. For example, in one practical embodiment of the invention an increase in air pressure from 5 lbs. per square inch to 35 lbs. per square inch increases the resonant frequency from 101 to 120 cycles per second, and in another from 50 to 82 cycles per second.

Because of the sturdy structure and mechanical nature of the device, large driving forces may be transmitted efficiently to the substantially rigid base element 10 and from the latter to the edge-clamped diaphragm in opposite phase relation and with minimum undesired modes of vibration so that the sound pressure wave is almost purely sinusoidal and the stresses are so distributed as to reduce likelihood of mechanical failure to a minimum.

One practical embodiment using a pre-formed, dished diaphragm 20 inches in diameter and approximately one-eighth inch thick, operating in an octave band of 70 to 140 cycles per second at a depth of about 12 feet from the surface of the water, produced an optimum sound-pressure level of 168 decibels above .0002 dynes per cubic centimeter at a point near bottom about 40 feet below the surface and a horizontal distance of 6 feet from the source.

Investigations looking to the design and installation of acoustic mines, sound detection devices and the like are made possible through utilization of the following method in determining the acoustical characteristics of the bottom of a water-way that is whether acoustically "soft," "hard" or "transitional." It has been found that the reflections of periodic sound waves from the top and bottom bounding surfaces of a water-way give rise to standing wave patterns beneath a ship-carried sound source and that the sound pressure near the bottom, say within a quarter wave length, may represent a minimum, a maximum or an intermediate position in the pattern depending upon whether the bottom is acoustically "soft," "hard" or "transitional." As will be shown later, these differences may be large.

A method of ascertaining the above-mentioned acoustical characteristics of the bottom of a river, comprises the setting up of a sound field beneath a ship by operation of a sound generator, such as that above described, carried by the ship and placed in the water beneath the ship, preferably a distance of a quarter-wave length below the surface, and not substantially less, although it may be more. During maintenance of such sound field a sound responsive device is raised vertically from the bottom of the water-way from a point substantially directly below the sound generator to near the surface of the water to detect the sound intensity at different vertical distances from the bottom below the ship. Preferably the sound responsive device is in the form of a hydrophone and is raised at a substantially uniform velocity while the sound pressure level detected thereby is progressively recorded in any known or other suitable manner to produce a record of sound intensity plotted against distance from the bottom. Such a manner of recording is exemplified in the patent to M. M. Kinley 2,210,417, dated August 6, 1940. It is from an observation of the variations in intensity at different vertical distances from the bottom thus obtained that the standing wave pattern giving the location of zones of minimum and maximum pressures is ascertained, which conditions indicate the acoustical character of the bottom.

Typical records for hard and soft bottom using a pressure actuated hydrophone are shown superposed in Fig. 5 where the dotted-line curve represents a soft-mud bottom and the solid-line curve a bottom of hard sandy mud. The ordinates indicate decibels above .0002 dynes per square centimeter while the abscissas indicate distance from bottom in feet.

The average pressure level gradients shown by the records are much the same. The initial phases of the standing wave systems are such, however, that a pressure-actuated hydrophone placed on the soft bottom (dotted-line curve) would record 16 decibels lower sound level than the same unit placed on the hard bottom (solid-line curve) assuming the same sound source in both cases.

Such knowledge is important where advantageous placement is desired for pressure-actuated hydrophones, acoustic mines and similar devices. Similar records obtained with a velocity or pressure-gradient hydrophone show a behavior, in the response of such hydrophone, the reverse of that of the pressure actuated hydrophone, that is, maximum response will be obtained from a velocity actuated receiving unit near the bottom when placed substantially directly on a soft bottom or a quarter-wave length above a hard bottom. Comparison records coinciding as to frequency and variations in depth but made one with a pressure actuated hydrophone and the other with a pressure-gradient hydrophone, are shown in Fig. 6. Discovery of the above phenomena teaches that advantage can be taken of the phase relations of standing waves by the employment of velocity actuated receiving mechanisms in the design of acoustic mines intended to be actuated by sounds from a ship passing directly thereover, in areas where the bottom is known to be predominantly soft and the mine is to be placed substantially directly on the soft bottom or at the water-mud boundary. Such devices will be less critically dependent upon their position near the bottom than sound-pressure actuated units, and their response will not be seriously weakened by their being covered or partly covered by the mud or silt of a soft bottom. Because the standing wave patterns of different frequencies manifest the same initial phase near the bottom, and because this holds true for a considerable horizontal distance from the sound source, it will be obvious that even with a complex wave-form there will be a maximum velocity response at the bottom. On the other hand, in case of a hard bottom the use of pressure responsive devices is indicated.

It will be clear that a knowledge of the acoustical character and concomitant physical condition of the bottom of a given water-way may be obtained from records produced as above described.

A convenient method of interpreting such a record curve to ascertain the acoustical character of the bottom is to compare it with a group of theoretical curves computed from a wide variety of hypothetical acoustical conditions, the acoustical condition of the bottom over which a particular experimental record is made being substantially that represented by the theoretical curve most closely matched by the experimental record.

The invention described herein may be manufactured and used by or for the Government of the United States of America for governmental purposes without the payment of any royalties thereon or therefor.

What is claimed is:

1. The method of ascertaining the acoustical condition near the bottom of a water-way which method comprises directing sound waves through the water from a point at a given level below the surface to produce reflection from top and bottom bounding surfaces of the water-way and maintain a constant single standing wave pattern having substantially fixed zones of maximum and minimum sound pressure while detecting variations in acoustic pressure in the one stationary wave pattern along a line extending upwardly from the bottom and plotting alternate maximum and minimum pressure zones whereby to permit determination of the initial phase of the reflected wave near the bottom substantially vertically below the source.

2. The method of ascertaining the acoustical condition near the bottom of a water-way which method comprises maintaining a standing sound wave pattern by reflection from the top and bottom bounding surfaces of the water-way, while progressively detecting and recording static acoustic pressures at successive points along a line extending upwardly from the bottom to produce a record of sound intensity plotted against distance from the bottom whereby to permit determination of the initial phase of the reflected wave at the bottom.

3. The method of ascertaining the acoustical condition near the bottom of a water-way which method comprises maintaining a single standing wave pattern by reflection from the top and bottom bounding surfaces, and, detecting and recording static acoustic pressure at successive points along a line extending upwardly from the bottom to product a record curve of sound intensity plotted against distance from the bottom for comparison with a ground of curves computed theoretically from a variety of hypothetical acoustical conditions representative of different physical conditions of the bottom of a water-way.

4. The method of ascertaining the acoustical conditions near the bottom of a water-way which method comprises establishing and maintaining a field of standing waves of substantially fixed pattern by reflection from the bottom, and progressively recording variations in sound pressure in the standing wave pattern at varying vertical distances from the bottom to produce a record of sound intensity plotted against distance from the bottom.

References Cited in the file of this patent

UNITED STATES PATENTS

| | | |
|---|---|---|
| 1,194,376 | Furber | Aug. 15, 1916 |
| 1,968,448 | Harrison | July 31, 1934 |
| 2,043,984 | Alder | June 16, 1936 |
| 2,210,417 | Kinley | Aug. 6, 1940 |
| 2,394,461 | Mason | Feb. 5, 1946 |
| 2,534,437 | Ginzton | Dec. 19, 1950 |
| 2,556,299 | Scott | June 12, 1951 |
| 2,625,460 | Cloud et al. | Jan. 13, 1953 |

OTHER REFERENCES

Literature—"A Sound Source for Investigating Microphone Distortion," by William D. Phelps, Journal of Acoustical Society of America, volume 11, October 1939, pp. 219–221.